(12) United States Patent
Lemel et al.

(10) Patent No.: US 7,170,486 B2
(45) Date of Patent: Jan. 30, 2007

(54) DEDICATED KEYBOARD NAVIGATION SYSTEM AND METHOD

(75) Inventors: Gil Lemel, Hertzelia (IL); Ety Gofer, Moshay Nir Banim (IL)

(73) Assignee: Comfyware Ltd., Bnei-Brak (IL)

( * ) Notice: Subject to any disclaimer, the term of this patent is extended or adjusted under 35 U.S.C. 154(b) by 805 days.

(21) Appl. No.: 09/855,885

(22) Filed: May 15, 2001

(65) Prior Publication Data

US 2002/0188721 A1 Dec. 12, 2002

(30) Foreign Application Priority Data

May 14, 2001 (IL) ...................................... 143136

(51) Int. Cl.
G09G 5/00 (2006.01)
H03M 11/00 (2006.01)
G09B 21/00 (2006.01)

(52) U.S. Cl. ........................ 345/156; 341/21; 434/112

(58) Field of Classification Search ........ 345/156–168; 400/473, 489, 490; 709/204, 205; 434/112–117, 434/227; 341/21, 22
See application file for complete search history.

(56) References Cited

U.S. PATENT DOCUMENTS

| | | | |
|---|---|---|---|
| 5,854,624 A | | 12/1998 | Grant |
| 5,892,503 A | * | 4/1999 | Kim ............................ 345/168 |
| 6,195,085 B1 | * | 2/2001 | Becker et al. .............. 345/163 |
| 6,618,039 B1 | * | 9/2003 | Grant et al. ................. 345/168 |
| 6,686,908 B1 | * | 2/2004 | Kobayashi ................... 345/173 |
| 6,696,985 B2 | * | 2/2004 | Houston ....................... 341/21 |
| 2003/0187925 A1 | * | 10/2003 | Inala et al. ................. 709/204 |
| 2004/0091842 A1 | * | 5/2004 | Carro .......................... 434/112 |
| 2005/0233287 A1 | * | 10/2005 | Bulatov et al. ............. 434/114 |

FOREIGN PATENT DOCUMENTS

| | | |
|---|---|---|
| DE | 19938744 | 2/2001 |
| WO | WO0067096 | 11/2000 |
| WO | WO0111788 | 2/2001 |
| WO | WO0116681 | 3/2001 |

* cited by examiner

Primary Examiner—Richard Hjerpe
Assistant Examiner—Kevin M. Nguyen
(74) Attorney, Agent, or Firm—Cooper & Dunham LLP (57) ABSTRACT

A system for the secure access of individuals belonging to a community to Internet resources, comprising a dedicated keyboard provided with an identification means suitable to identify it when accessing a web site, and an automatic URL calling means suitable to force a browser coupled with said keyboard to open a web page the URL of which is supplied by said keyboard, the system further comprise one or more web pages the access from which is limited to specific predetermined web pages, the access to the World Wide Web from such pages being precluded.

31 Claims, 4 Drawing Sheets

DEDICATED KEYBOARD NAVIGATION SYSTEM AND METHOD

FIELD OF THE INVENTION

The present invention relates to the field of navigation of SGML documents. More particularly, the invention relates to a method and apparatus for launching a markup language viewer for accessing and navigating, utilizing a dedicated input device. Still more particularly, the invention relates to Internet navigation system, apparatus and method for special communities.

BACKGROUND OF THE INVENTION

Markup languages are specially designed to allow efficient and comfortable methods for organizing and viewing document(s). A special viewer, also known as a parser, enables identifying, viewing, and browsing through document elements. Document elements are identified by the utilization of special tags which are embedded into the document and which designate the element's purpose and/or function. The Markup language documents are usually arranged in some hierarchical form, and identified elements within the documents are usually linked to other elements in the document, or in other documents, by the tags mentioned above.

Standard Generalized Markup Language (SGML) is a standard for specifying document markup languages (tag set). The HyperText Markup Language (HTML), for instance, is an SGML application widely used today for publishing files on the Internet. HTML documents on the Internet are usually linked with, and/or comprise links to, other documents, which may be on the same server, or on another server in a computer network or sub-network. This linking of HTML documents over the Internet enables users to access published and unpublished data, stored on Internet servers all over the world, on what has become the worldwide information highway.

Most of the HTML documents published on the Internet today have links to many other documents, which will most often comprise more links. This linking may be illustrated in the form of a web; therefore, HTML documents which comprise many links to related documents are usually referred to as web sites. The most convenient and popular way of viewing HTML documents over the Internet is by using an HTML parser, also known as Internet browser (e.g., Netscape). The HTML browsers are designed to allow the authors of such documents to comprise stylish and colorful texts, and many other types of multimedia content, such as image, audio, and Flash, animations, videos, etc.

When the user launches the Internet browser, a selected HTML document, also known as the home page, is loaded and presented to the user. The home page may be chosen to be any HTML document on the Internet, but in general, these are HTML documents comprising search engines, and many links to other documents from a wide range of fields of interest. This HTML documents are also known as portals, and as implied, they indeed provide a portal to the Internet for the average user.

When accessing such a portal, the user is presented with links to documents, which are usually arranged in categories, such as Music and Arts, Sports, News, Games, etc. The user may select and view the content of a category or a document, simply by indicating his selection with a pointing device (e.g., mouse), and clicking the appropriate button on said device. This is the most common way for browsing the Internet, but it requires some basic skills. The user should be familiar with the document language, and in addition, the user should be capable of operating a pointing device, such as a mouse.

A great percentage of the HTML documents on the Internet are in the English language. However, although knowledge of the English language may greatly assist the average user in finding documents in a certain field of interest, in many cases the desired information is not linked to any of the categories in the common Internet portal. In such cases, the user may use the search engine for finding documents, which may concern, or relate to, the desired information. Searching the Internet is most often not a simple task. To efficiently find the right documents, a search strategy is required. Since a regular search is based on keywords, it will most often result in hundreds or thousands of documents comprising the searched keywords.

Such difficulties prevent users with mental and/or physical disabilities from accessing and interacting with the Internet, the worldwide information highway. In addition, the conventional SGML designs and interfaces require basic skills for users' interaction, such as comprehension of the document language, motor skills and coordination (i.e., operating a pointing device). Such skills may not yet be developed in children of young age (i.e., before the age of six), and may raise substantial difficulties for elderly populations to acquire. Furthermore, other populations with physical disabilities may also find it advantageous to be provided with access devices and related systems that help them overcome the difficulties caused by their disabilities.

Thus, there is a need for dedicated designs and apparatus allowing users, young children, elderly populations, and/or those with mental and/or physical disabilities (e.g., visually impaired), lacking the full skills required to interact with, and browse, markup language documents on computerized systems and/or over the Internet.

It is an object of the present invention to provide a method and apparatus for launching dedicated applications and for loading predefined documents utilizing a dedicated input device.

It is another object of the present invention to provide a method and apparatus enabling young children, elderly populations, and users with mental and/or physical disabilities to access dedicated content/information over the Internet.

It is a further object of the present invention to provide a method and apparatus for creating and maintaining a safe Internet environment, enabling young children and other sensitive populations, such as elderly or impaired people, to interact with, and participate in, dedicated activities and applications over the Internet, and disallow access to other Web sites.

Other objects and advantages of the invention will become apparent as the description proceeds.

SUMMARY OF THE INVENTION

In one aspect the invention is directed to a system for the secure access of individuals belonging to a community to Internet resources, comprising a dedicated keyboard provided with:

a) identification means suitable to identify it when accessing a web site, and b) automatic URL calling means suitable to force a browser coupled with said keyboard to open a web page the URL of which is supplied by said keyboard;

said system further comprising one or more web pages the access from which is limited to specific predetermined web pages, the access to the World Wide Web from such pages being precluded.

According to a preferred embodiment of the invention the URL calling means comprises a hardware device. According to another preferred embodiment of the invention the URL calling means comprises a software.

The invention also encompasses a method for the secure access of individuals belonging to a community to Internet resources, comprising providing:

A) a dedicated keyboard provided with identification means suitable to identify it when accessing a web site, and with automatic URL calling means, suitable to force a browser coupled with said keyboard to open a web page the URL of which is supplied by said keyboard;

B) providing one or more web pages associated with the system;

C) limiting the access from such web pages only to other specific predetermined web pages; and D) precluding the access to the World Wide Web from such pages.

According to a preferred embodiment of the invention there is further provided means to allow a user of the system to interact with another user of the system the identifying code of whose keyboard he knows.

In another aspect, the invention is directed to a method for the navigation and accession of hyperlinked documents utilizing a dedicated keyboard device, comprising:

a) providing a computerized system having I/O ports, and a parser for hyperlinked document applications;

b) providing hyperlinked applications/documents which comprise key accession events;

c) providing a dedicated keyboard device in which the keys are marked or shaped so as to designate their purpose and/or function; and d) interacting with said hyperlinked document applications, through said dedicated keyboard device.

According to a preferred embodiment of the invention the keys of the dedicated keyboard device are shaped in the form of icons and/or symbols.

Optionally, a standard keyboard device is allowed to remain operative while the dedicated keyboard device in connected to the system.

According to a preferred embodiment of the invention a parallel-to-serial converting device is provided, having an I/O port connected to an I/O port of said computerized system, said device being capable of receiving inputs of one or more dedicated parallel keyboard device(s), and of providing an output corresponding to that of a serial device. A selecting device can further be provided, to select the keyboard device that supplies an input to the system.

According to another preferred embodiment of the invention the dedicated keyboard device has a parallel I/O port, and the arbitration device comprises means for converting input symbols from said parallel I/O port, into a serial stream of bits. In still another preferred embodiment of the invention the dedicated keyboard device comprises an arbitration device having a serial I/O port, said arbitration device being capable of receiving inputs of one or more keyboard device (s) and/or of said dedicated keyboard device(s), and selecting the active input to be provided on said serial I/O port.

Typically, the computerized system is connected to a computer network and/or the Internet, and the hyperlinked document applications are stored on computers/servers connected to said computer network and/or the Internet.

According to a preferred embodiment of the invention the dedicated keyboard device comprise a unique identifying code, and a computers/servers is in connection with the computerized system through a computer network and/or the Internet, and is capable of interrogating said dedicated keyboard device, and of obtaining said unique identifying code therefrom.

The hyperlinked document can be of any suitable type, e.g., an SGML document, such as an HTML document, and the hyperlinked document application is then an SGML application.

The invention is also directed to a method wherein hyperlinked document/application(s) are automatically loaded to the computerized system whenever the dedicated keyboard device is activated, comprising:

a) providing a software application operating on said computerized system, said software application periodically interrogating the computerized system I/O port(s) to detect if said dedicated keyboard device is attached and active, upon detection of activation/connection of said dedicated keyboard device, performing the following steps:

a.1) activating a predetermined SGML application utilizing an appropriate parser, and loading an SGML document, said SGML document residing on said computerized system or on other computer/server in the computer network and/or Internet; and a.2) accessing/navigating other SGML documents linked to said SGML application, utilizing keys of said dedicated keyboard device.

Also encompassed by the invention is an arbitration device for selecting the keyboard device that supplies an input to the computerized system, comprising:

a) a parallel to serial converter;

b) a selector;

c) one or more I/O serial ports of serial device(s);

d) one or more parallel I/O ports of a dedicated keyboard device; and e) a standard serial keyboard output port.

Furthermore, the invention is directed to a system for the navigation and accession of hyperlinked documents, comprising:

a) computer apparatus;

b) display mean; and c) dedicated keyboard device;

wherein the dedicated keyboard device is provided with dedicated keys marked or shaped so as to visually correspond to a hyperlinked marked portion of a document displayed on the display means.

According to a preferred embodiment of the invention there is provided a system for the navigation and accession of hyperlinked documents, comprising:

a) computer apparatus;

b) display mean; and c) dedicated keyboard device;

wherein the dedicated keyboard device comprise keys shaped in the form of icons and/or symbols.

Also comprised is a system for the navigation and accession or hyperlinked documents, comprising:

a) computer apparatus;

b) display mean; and c) dedicated keyboard device;

further comprising an arbitration device comprising a parallel to serial converter, a selector, one or more serial I/O ports of serial device(s), and one or more parallel I/O ports of a dedicated keyboard device.

The system may further comprise a telephone set, connected the computer, and which enables telephone communication via a computer network and/or the Internet. In addition, the appearance of the keys may be changed utilizing key covers, where said key covers are shaped in the form of icons and/or symbols.

The following terms are defined as follows:

I/O device—a device that transfers data to or from a computerized system.

Serial device—an I/O device (having a serial I/O port) from/to which data signals are output/input in a form of a serial stream of sequential signals, each signal is also referred to as a "bit" of information.

Parallel device—an I/O device (having a parallel I/O port) from/to which data signals are output/input in a form of a set signals, each set of signals is produced concurrently, and is also referred to as a data symbol.

Parallel to serial converter—a device capable of converting parallel signals into a stream of serial signals.

Hotspot—an area in a graphic or picture containing a hyperlink.

Population—a group of individuals having a common attribute, such as age, physical disability, etc., All the above and other characteristics and advantages of the invention will be further appreciated through the following illustrative and non-limitative description of preferred embodiments thereof.

DETAILED DESCRIPTION OF PREFERRED EMBODIMENTS

The present invention relates to a method for browsing hyperlinked documents (e.g., having embedded hotspots), and is particularly intended to provide easy and convenient means for browsing such documents, HTML and/or Flash in particular, over a computer network and/or the Internet, or locally (on a personal computer). Implementations of the invention, in any of the embodiments disclosed herein, are intended to provide a tool for browsing hyperlinked documents, and especially intended to provide an easy and convenient browsing tool for young children, elderly populations, and/or mentally/physically disabled people.

Figure 1:
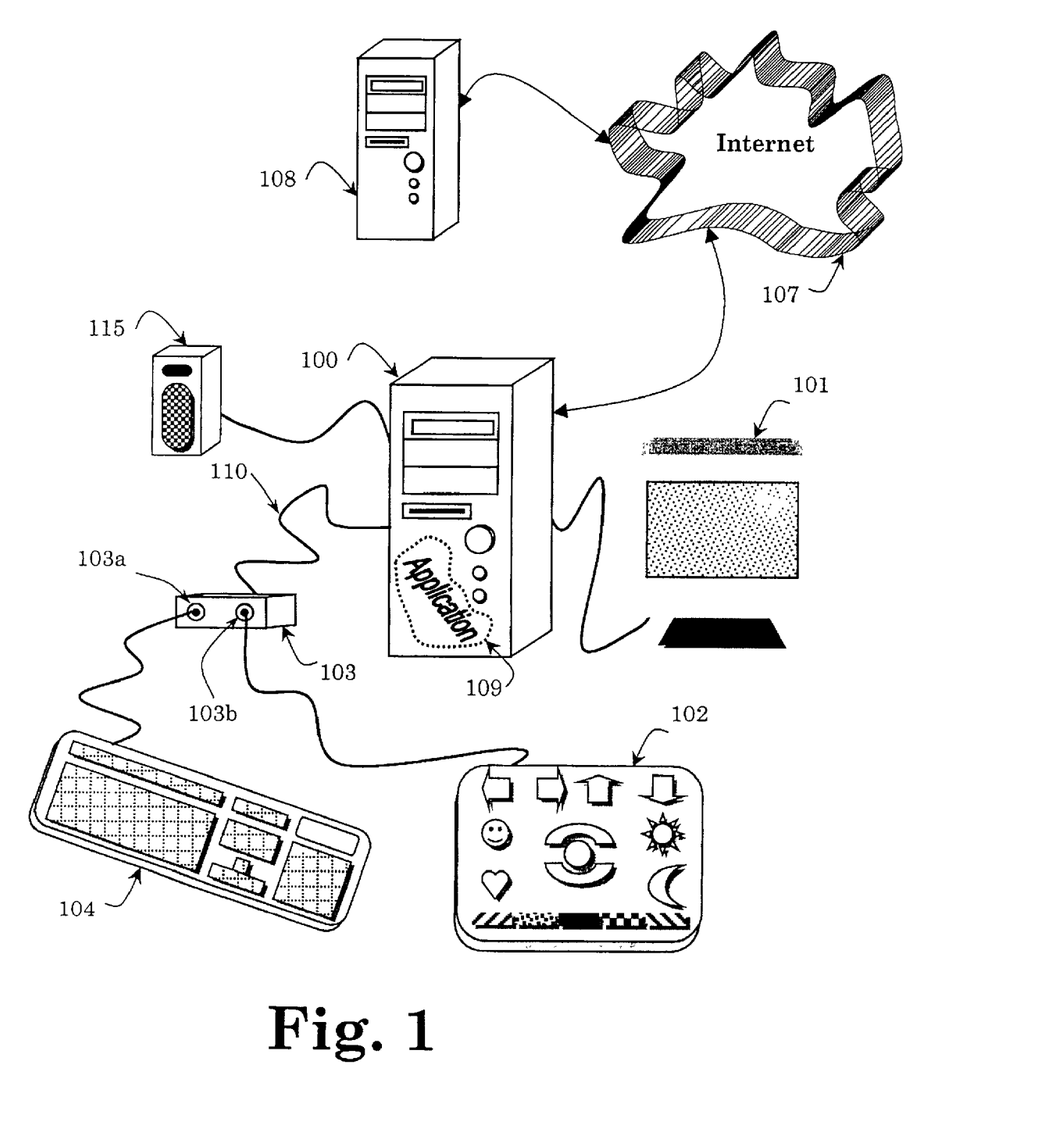
FIG. 1 schematically illustrates a system and method according to a preferred embodiment of the invention.

FIG. 1 schematically illustrates a system and method according to preferred embodiment of the invention, wherein a dedicated device 102 is utilized for browsing hyperlinked documents on the Internet 107 through a computerized system 100. According to a preferred embodiment of the invention, said dedicated device is a keyboard/keypad comprising sets of keys (or defined areas) specially designed and shaped to present abstract browsing tools to the user. For example, a set of colored keys may be utilized for browsing or for selection of hotspots. In this way a dynamic interface can be easily constructed, in which the function of each color is visually displayed on a display device. In one instance, for example, the functionality of each color may be utilized for accessing links from higher/lower levels, and in another instance each color may be utilized for selection of graphical hotspots, or as well for choosing between menu options which may be visually/vocally presented to the user.

A display device 101 and/or an audio output device 115 can indicate the functionality of each key. In this way, the function of each key may be displayed, or provided vocally (e.g., synthesized voice). For example, one possible scenario may one in which a set of colored keys is utilized to browse an HTML document. In this case, the graphical display 101 can be utilized to display icons/symbols representing the functionality of each key, where each displayed icon/symbol is painted in the color of the corresponding key. Another possible implementation may be one in which the functionality of each key is audibly presented to the user, for instance, by the sound of a human voice generated through the audio output device 115 whenever a key is touched.

By utilizing a display device 101 to indicate the functionality of keys, key designation can be made also according to key location, shape, pattern, and symbol/icon appearing on the key. Moreover, in a preferred embodiment of the invention, the user is able to change the covers of the keys, thereby allowing a dynamic change in the appearance of the keys, wherein special sets of key covers are provided in accordance with user/application specifics. For example, key covers may be specially designed to include textures, Braille characters, or to be carved to include shapes/patterns, and may also be manufactured from different type of materials (e.g., wood, rubber, metal, etc.).

A special adapter 103, comprising connectors 103a and 103b, is utilized to allow attaching the dedicated device 102 to the keyboard I/O port of the computerized system 100. This allows designs of hyperlinked documents in which browsing is based on pressed keys. The adapter 103 enables connection of more than one keyboard to the computer system 100. As exemplified in FIG. 1, a conventional keyboard 104 may be also connected to the computer system 100. However, the adapter 103 should comprise appropriate connections to allow connecting other types of keyboards (e.g., Comfy keyboard), and appropriate circuitry to allow conversion of signals from such keyboards into standard keyboard scan codes.

In another preferred embodiment of the invention, the adapter 103 is integrated into the dedicated device 102, such that said device is connected directly to the computer system 100, and any additional keyboards are connected to said device.

In a preferred embodiment of the invention, the keyboard device 102 is utilized to launch a browsing application on the computer system 100, and to automatically load documents from a distant Internet server 108, via the Internet. In such embodiments, a running application 109 is utilized to periodically scan the keyboard port, and to detect the presence of the dedicated keyboard device 102. For this purpose a device, called hereinafter "URL calling means" can be employed, which can be a simple microprocessor programmed to transmit a URL, or a software program can be employed, which is activated by the detection of the keyboard or by a specific key. Similarly, the microprocessor and associated memory means may contain the identifier of the keyboard. Both the identifier and the URL calling means may be provided in the same device or on separate devices.

When the running application 109 detects that keyboard device 102 is connected, it activates an Internet browser and establishes connection with a remote Internet server 108 which comprises dedicated hyperlinked documents enabling keyboard navigation via the keyboard device 102. Alternatively, such documents may be loaded locally form the computer system 100. This type of embodiment may be utilized to enable Internet interaction for users, not capable of utilizing the conventional means available today. For instance, one embodiment of the invention may be particularly intended for the blind. In this case, special hyperlinked documents are designed to comprise sets of linked audio files, and the keyboard device is specially designed to comprise keys with Braille characters, and/or which are specially shaped to provide abstract presentation of the navigation possibilities. It should be understood that in such an embodiment, the hyperlinked documents are specially designed to comprise audible presentations and instructions for interaction and browsing.

In another preferred embodiment of the invention, a running application 109 is programmed to automatically launch a browsing application, and load documents from a distant Internet server 108, or locally, from the computer system 100, upon pressure of a dedicated key in the dedicated keyboard device 102. In such embodiment, the application 109 may be programmed to enable the access to a set of predefined documents, and/or content types. Moreover, the accessibility (i.e., the type of documents/content) provided via the application 109 may be changed dynamically, according to the specific user need/wish. Such a change in the accessibility may be performed over a computer network and/or the Internet.

In yet another preferred embodiment of the invention, the keyboard device 102 is specially designed to be utilized as an interfacing device for young children (e.g., age of 18 months to 6 years old). In this case, the keys of keyboard device 102 are designed to consist of different colors, icons, and patterns, which are then utilized for the design of interactive applications to be embedded into the hyperlinked documents on the remote Internet server 108 (or locally). As previously explained, the key functionality may vary, and functions may be assigned dynamically on the basis of color, location, shape, pattern, and/or icons.

Figure 3A:
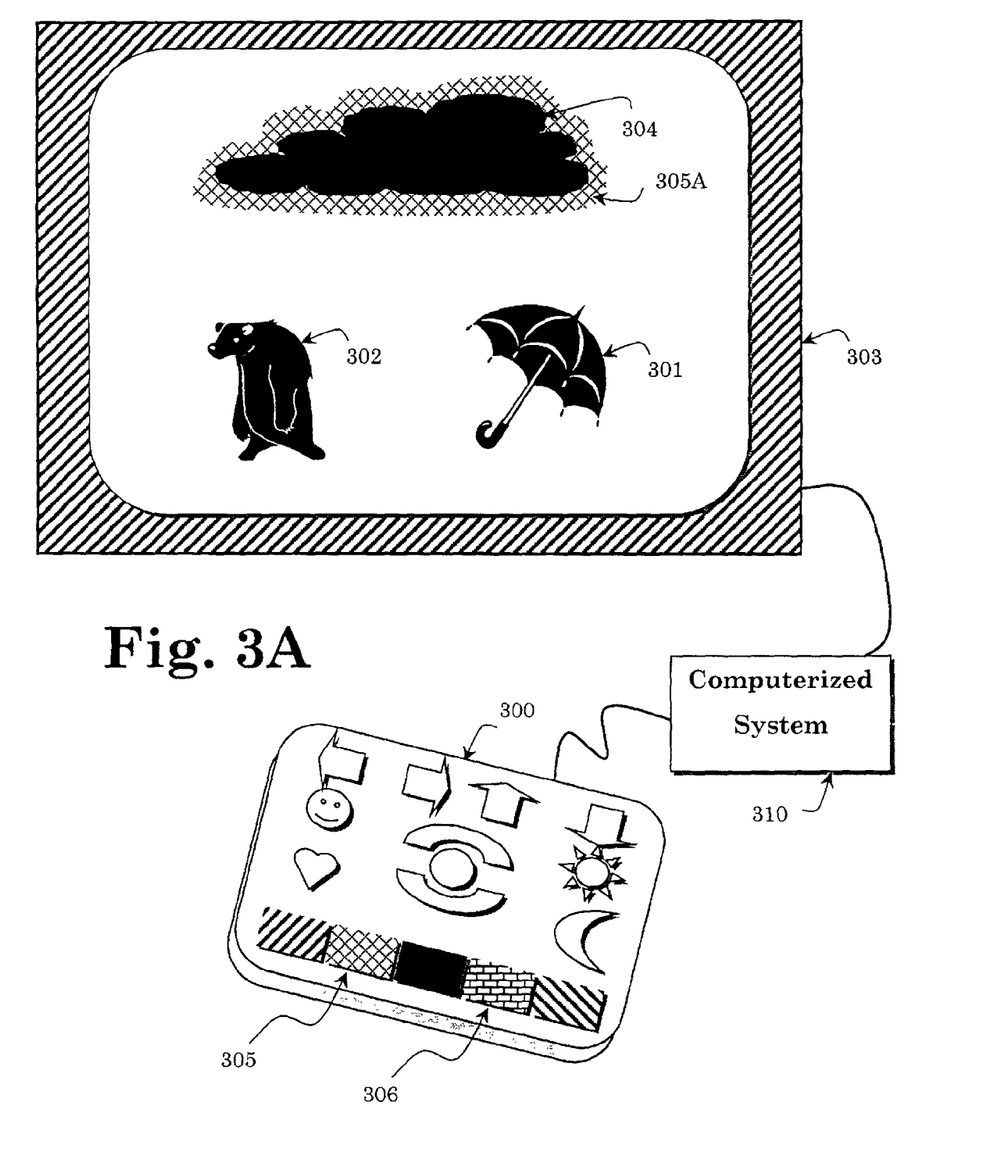
FIGS. 3A and 3B exemplify an interactive application according to a preferred embodiment of the invention.
Figure 3B:
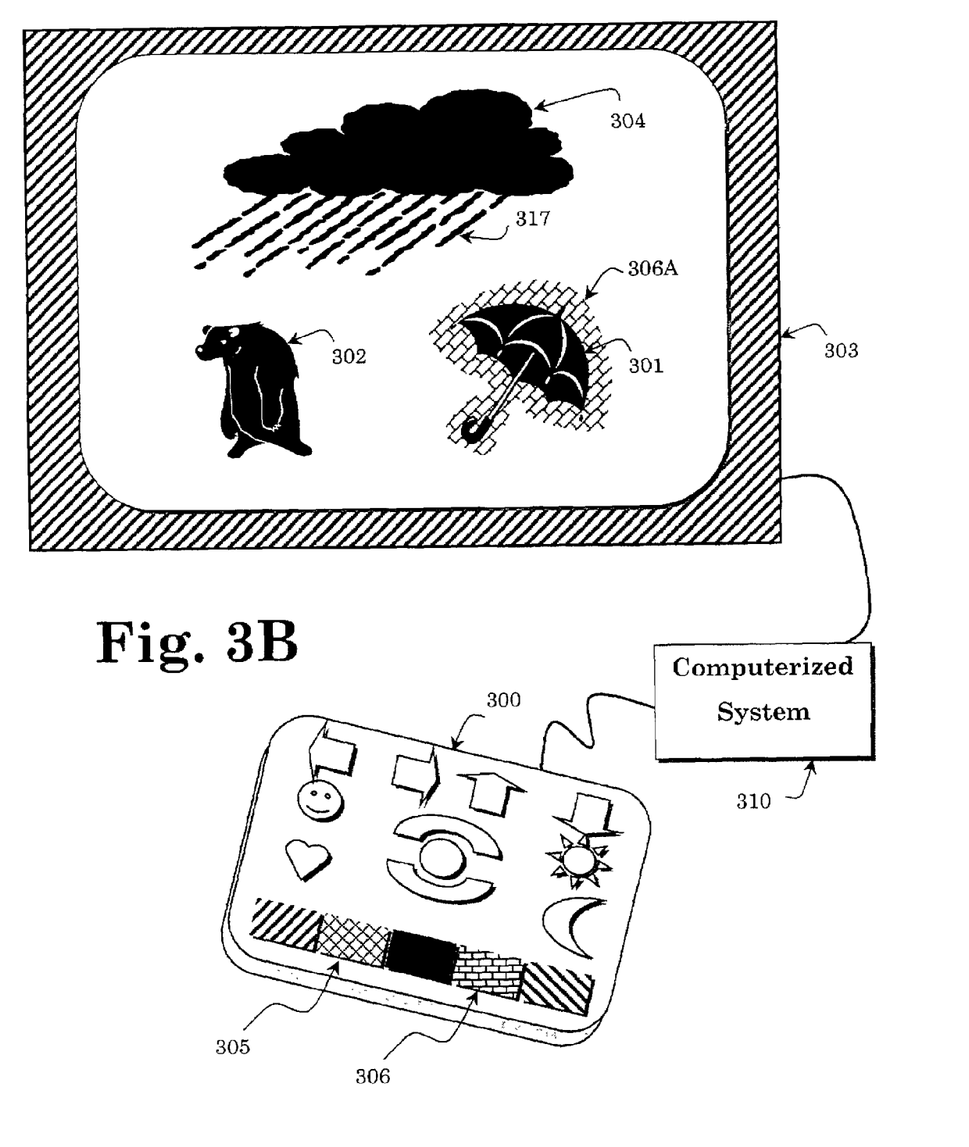

FIGS. 3A and 3B exemplify one possible implementation for interactive applications, according to a preferred embodiment of the invention. As will be appreciated by the skilled person, this is only one example of many possible different applications and, as the other examples given herein, is not intended to limit the invention in any way. In FIG. 3A the display means 303 is utilized to display the document's objects, cloud 304, umbrella 301, and a cartoon image (a bear) 302. The display means 303 is connected to a computerized system 310, to which a dedicated keyboard device 300 is also connected. The cloud 304 is marked by a "halo" 305A having a pattern and/or color, which corresponds to one of the keys, 305, of the dedicated keyboard device 300.

The "halo" 305A may be blinking and/or changing color and/or luminance intensity to guide the user to interact by pressing the corresponding key 305, of the dedicated keyboard 300. User interaction, i.e., pressing on key 305, is followed by visual and/or audio effects as schematically illustrated in FIG. 3B. In the example of FIG. 3B, pressing on key 305 results in a rainfall 317, the disappearance of the cloud's "halo" 305A, and the presence of a new "halo" mark, 306A, surrounding the umbrella 301. As exemplified in FIG. 3B, the corresponding key for further interaction is 306. It should be understood that audio effects may be introduced in addition to the visual effects exemplified herein.

It should be understood that the method of the invention, exemplified herein above, may be implemented to provide a plurality of "halo" elements at any given time. Each "halo" may be designated by a different color/pattern, providing the user with a range of different possibilities. The linkage between displayed objects and keyboard keys may be based on any method which designates the displayed object by properties of the corresponding key, such as symbols, icons, location, and even texture. Alternatively, keyboard keys may be linked to display objects, without providing the user with an explicit indication.

This embodiment is particularly efficient for allowing very young children to browse dedicated Web sites linked to similar Web sites which do not provide links to other Web sites on the Internet, which are defined as not appropriate. More particularly, such an embodiment may be utilized to allow user access only to a set of predetermined Web sites, and hence prevent access of users to other types of Web sites. In this way, closed sets of linked documents may be created, which provides a safe and friendly browsing environment for the target users.

In general, Web sites that are designed for interaction of young or disabled users should develop special browsing tools according to the specific implementation. For instance, in implementations intended for young children, special icons appearing on the keyboard device 102 may also be used to designate links to other objects in the hyperlinked document. Additionally, audial instructions may be embedded into the documents to guide the users. For instance, a vocal instruction may be provided saying, "press the red button" or "press the square button", and upon pressure of the indicated key the corresponding links and/or hotspots, embedded in the document, are activated.

Figures 2A, 2B:
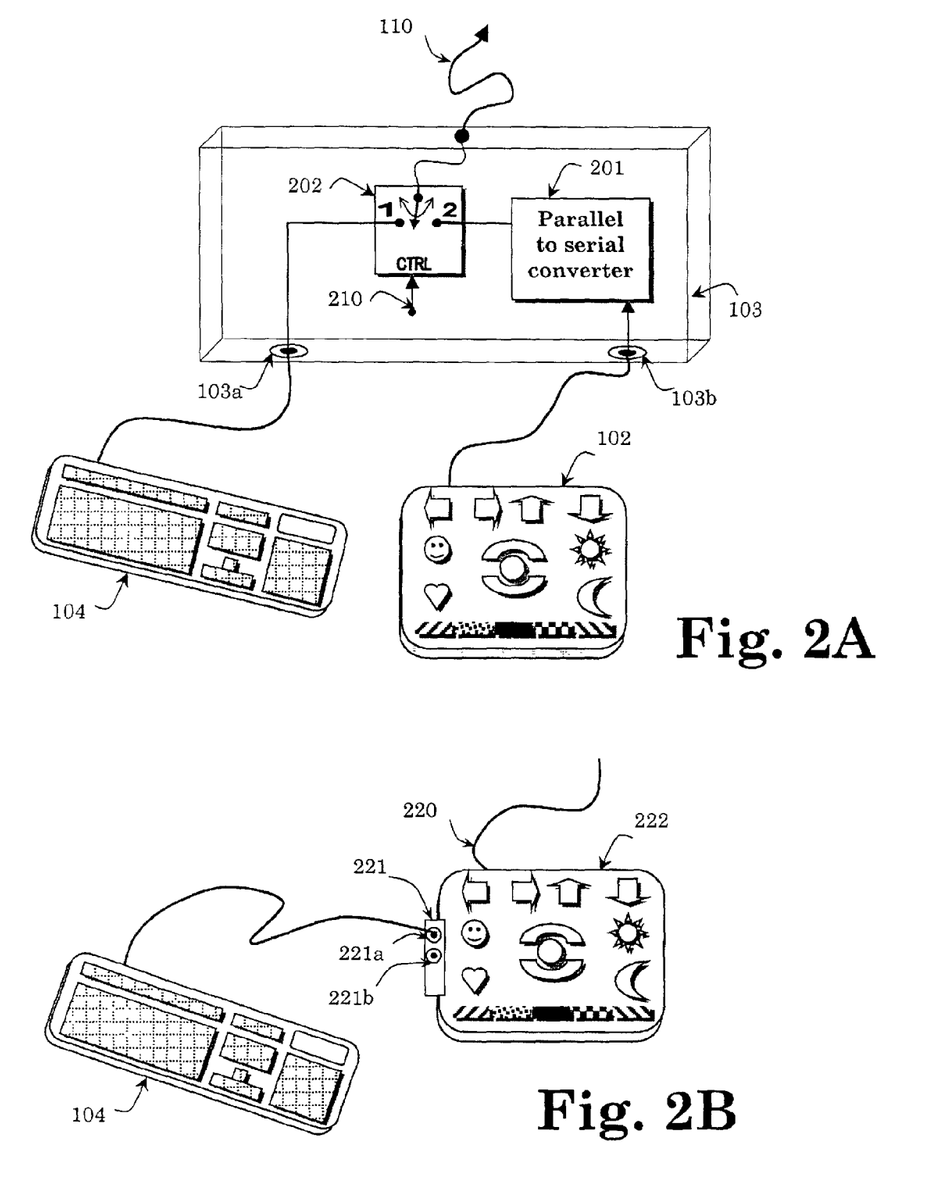
FIG. 2A schematically illustrates a connection assembly according to a preferred embodiment of the invention.
FIG. 2B schematically illustrates another connection assembly according to a preferred embodiment of the invention.

FIG. 2 schematically illustrates the structure of the adapter 103. In the case exemplified by FIG. 2, the adapter 103 provides an interface for a special keyboard device 102 having a parallel output connected to the adapter connector 103b. To allow the connection of such device to the keyboard input of a computerized system 100, a parallel to serial converter 201 is utilized. More particularly, the parallel-to-serial converter receives symbols of data from a parallel input port 103b, and produces a corresponding stream of data bits.

A standard keyboard device 104 may also be connected via a serial input port 103a, and an arbitration device 202 is then utilized for selection of the operating keyboard. The state of the arbitration device 202 is selected by a control input 210. The control input 210 is set to provide the output connection 110 to the currently operating keyboard. Thus, more than one keyboard may be connected to the computer system 100, via the adapter 103. In state 1 of the arbitration 202 the standard keyboard 104 is selected, and in state 2 the special keyboard device 102 is selected. In a preferred embodiment of the invention, a microcontroller is utilized to implement the parallel-to-serial converter 201 (for example Motorola's MC68HRC908JK1), and the arbitration device 202 is a switch/Multiplexer device (for instance MC14066 Quad Analog Switch/Quad Multiplexer).

As will be appreciated by the skilled person, the dedicated keyboard device 102 may be designed to produce serial signals, wherein activating a key on said dedicated keyboard device results in a corresponding output of a serial bit stream. In such implementations of the invention, there is no need for a parallel-to-serial conversion, as performed by the converter 201 illustrated in FIG. 2A. A preferred embodiment of the invention for such implementations is illustrated in FIG. 2B, wherein an arbitration device 221 is embedded into the dedicated keyboard device 222. As described above, the keyboard 222 produces streams of serial signals, and thus in this implementation there is no need for a converter. Thus, the arbitration device 221 comprises one or more input(s), 221a–b, for a standard keyboard 104, and an arbitration (not shown)for selecting the currently active keyboard, such that for each state of the arbitration device the output of another keyboard device (104, or 222 for instance) is connected to the output 220.

In another preferred embodiment of the invention, the dedicated keyboard device has an USB interface, which is thereby capable of inputting and outputting data form/to a computer system 100, through a USB connector/adapter. In this case, the dedicated USB keyboard device is designed to provide the users a verity types of indication, which may be visual (e.g., a blinking light), sensual (e.g., vibrations), vocal, etc.

It should be noted that the method of the invention is not limited to the connectivity of the dedicated keyboard device through the keyboard input port. The invention may be implemented in a variety of ways to allow connection of a dedicated keyboard device to a computer system through parallel/serial ports, USB ports, joystick, and midi ports, etc. Additionally, the dedicated keyboard device, or the adapter, may also comprise an identifying code, which allows for the unique identification of users connected to a web site. In one preferred embodiment of the invention, the application 109 interrogates the keyboard/adapter (or alternatively, the user is requested to press a combination of keys), to obtain the identifying code.

In this way, once a user is connected to a web site utilizing a dedicated keyboard device, it presence can be advertised to other predefined users, or groups of users, who may then establish communication with the first user using any suitable program, such as a chat, over the Internet. Another example is the playing of interactive games over the Internet, in which two or more users participate. A first user, knowing the identifying code of a second user with whom he wishes to play, may access the game on the dedicated site, and allow the owner of the code which he knows to join in the game. This can be done either by defining the identifying code of the second user when accessing the game, or predefining it at another time. As will be apparent to a skilled person, the secure identification of the connected keyboards allows for a variety of different uses of which the above are only simply examples.

In yet another preferred embodiment of the invention, the dedicated keyboard device is equipped with a telephone set, having audio input and output devices. In this embodiment the telephone set is connected to the computer system 100, utilizing a dedicated I/O port (not shown), which is connected to the audio I/O port (not shown) on the computer system (e.g., sound card). In this way, users may establish communication over a computer networks and/or the Internet, utilizing the telephone set embedded in the dedicated keyboard device. More particularly, users which their presence (i.e., connection of the dedicated keyboard device) is advertised may activate a communication utility, which employ the telephone device. Alternatively, such a connection may be also provided utilizing other means, such as ICQ, for example.

Additionally, it should be clear that the method of the present invention is not limited to HTML/SGML or any other type of hyperlinked document. As will be appreciated by persons skilled in the art, the method of the present invention may be implemented with any software/application capable of receiving inputs from a keyboard/keypad, and capable of providing visual and/or audio outputs utilizing a display and/or audio out device(s).

The above examples and description have of course been provided only for the purpose of illustration, and are not intended to limit the invention in any way. As will be appreciated by the skilled person, the invention can be carried out in a great variety of ways, employing techniques different from those described above, all without exceeding the scope of the invention.

The invention claimed is:

1. A method for the accession of hyperlinked documents by users having mental and/or physical limitations, comprising:
   a) providing a computerized system having I/O ports, and a parser for hyperlinked document applications;
   b) providing hyperlinked applications/documents which comprise key accession events;
   c) providing a dedicated keyboard device in which the keys are designed and/or shaped in such a way so as to provide an unequivocal mental association with a corresponding hyperlinked document and which are electrically connected with said computerized system;
   d) pressing a selected key of said dedicated keyboard device; and
   e) establishing a link with a hyperlinked document associated with said pressed key.

2. A method according to claim 1, wherein the keys of the dedicated keyboard device are shaped in the form of icons and/or symbols.

3. A method according to claim 2, wherein the dedicated keyboard device is provided with a unique identifying code, and a computer/server in communication with the computerized system via a computer network and/or the Internet, interrogates said dedicated keyboard device and receives said unique identifying code.

4. A method according to claim 1, wherein a standard keyboard device is allowed to remain operative while the dedicated keyboard device is connected to the computerized system.

5. A method according to claim 4, wherein the dedicated keyboard device is provided with a unique identifying code, and a computer/server in communication with the computerized system via a computer network and/or the Internet interrogates said dedicated keyboard device and receives said unique identifying code.

6. A method according to claim 1, further comprising the steps of connecting an I/O port of a parallel-to-serial converting device to an I/O port of said computerized system and receiving inputs of one or more dedicated parallel keyboard device(s) by said converting device, whereby to provide an output corresponding to that of a serial device.

7. A method according to claim 6, selecting a keyboard device that supplies an input to the computerized system by means of a selected device.

8. A method according to claim 7, wherein the dedicated keyboard device is provided with a unique identifying code, and a computer/server in communication with the computerized system via a computer network and/or the Internet interrogates said dedicated keyboard device and receives said unique identifying code.

9. A method according to claim 6, wherein the dedicated keyboard device is provided with a unique identifying code, and a computer/server in communication with the computerized system via a computer network and/or the Internet interrogates said dedicated keyboard device and receives said unique identifying code.

10. A method according to claim 1, further comprising the steps of providing the dedicated keyboard device with a parallel I/O port and converting input symbols from said parallel output port into a serial stream of bits.

11. A method according to claim 10, wherein the dedicated keyboard device is provided with a unique identifying code, and a computer/server in communication with the computerized system via a computer network and/or the Internet said dedicated keyboard device and receives said unique identifying code.

12. A method according to claim 1, wherein the dedicated keyboard device is provided with an arbitration device having a serial I/O port, and said arbitration device receives inputs of one or more keyboard device(s) and/or of said dedicated keyboard device(s) and selects one of said inputs as an active input to be provided on said serial I/O port.

13. A method according to claim 12, wherein the dedicated keyboard device is provided with a unique identifying code, and a computer/server in communication with the computerized system via a computer network and/or the Internet interrogates said dedicated keyboard device and receives said unique identifying code.

14. A method according to claim 1, wherein the computerized system is in communication with a computer network and/or the Internet, and the hyperlinked document applications are stored on computers/servers in communication with said computer network and/or the Internet.

15. A method according to claim 14, wherein the dedicated keyboard device is provided with a unique identifying code, and a computer/server in communication with the computerized system via a computer network and/or the Internet interrogates said dedicated keyboard device and receives said unique identifying code.

16. A method according to claim 14, wherein hyperlinked document/application(s) are automatically loaded to the computerized system whenever the dedicated keyboard device is activated, comprising:
  a) providing a software application operating on said computerized system, said software application periodically interrogating the computerized system I/O port(s) to detect if said dedicated keyboard device is attached and active, upon detection of activation/connection of said dedicated keyboard device, performing the following steps:
    a.1) activating a predetermined SGML application utilizing an appropriate parser, and loading an SGML document, said SGML document residing on said computerized system or on other computer/server in the computer network and/or Internet; and
    a.2) accessing/navigating other SGML documents linked to said SGML application, utilizing keys of said dedicated keyboard device.

17. A method according to claim 1, wherein the dedicated keyboard device is provided with a unique identifying code, and a computer/server in communication with the computerized system via a computer network and/or the Internet, interrogates said dedicated keyboard device and receives said unique identifying code.

18. A method according to claim 17, wherein a first user interacts, with a second user by inputting an identifying code of said second user.

19. A method according to claim 1, wherein the hyperlinked document is an SGML document, and the hyperlinked document application is an SGML application.

20. A method according to claim 19, wherein the SGML document application is an HTML document.

21. A method according to claim 1, wherein hyperlinked document/application(s) are automatically loaded to the computerized system whenever the dedicated keyboard device is activated, comprising:
  a) providing a software application operating on said computerized system, said software application periodically interrogating the computerized system I/O port(s) to detect if said dedicated keyboard device is attached and active, upon detection of activation/connection of said dedicated keyboard device, performing the following steps:
    a.1) activating a predetermined SGML application utilizing an appropriate parser, and loading an SGML document, said SGML document residing on said computerized system or on other computer/server in the computer network and/or Internet; and
    a.2) accessing/navigating other SGML documents linked to said SGML application, utilizing keys of said dedicated keyboard device.

22. A system for the accession of hyperlinked documents by users having mental and/or physical limitations, comprising:
  a) computer apparatus;
  b) display means; and
  c) dedicated keyboard device;
  wherein the dedicated keyboard device comprises which are designed and/or shaped in such a way so as to provide an unequivocal mental association with a corresponding hyperlinked document and which are electrically connected with said computer apparatus, a link being established with a hyperlinked document associated with a pressed key of said keyboard device and causing said document to be displayed on said display means.

23. A system according to claim 22, further comprising a telephone set connected with the computer apparatus and enabling telephone communication via a computer network and/or the Internet.

24. A system according to claim 22, wherein each key is provided with a replaceable key cover which is shaped in the form of an icon and/or symbol.

25. A system according to claim 22, wherein the keys are marked or shaped so as to visually correspond to a hyperlinked marked portion of a document displayable on the display means.

26. A system according to claim 20, comprising:
  a. identification means suitable to identify it when accessing a web site, and
  b. automatic URL calling means suitable to force a browser coupled with said keyboard to open a web page the URL of which is supplied by said keyboard; said system further comprising one or more web pages the access from which is limited to specific predetermined web pages, the access to the World Wide Web from such pages being precluded.

27. A system according to claim 26, wherein the URL calling means comprises a hardware device.

28. A system according to claim 26, wherein the URL calling means comprises a software module.

29. A system according to claim 22, further comprising an arbitration device comprising a parallel to serial converter, a selector, one or more serial I/O ports of serial device(s), and one or more parallel I/O ports of a dedicated keyboard device.

30. A system according to claim 22, wherein the keys are shaped to facilitate manipulation thereof by blind people so as to result in the subsequent loading of a desired associated hyperlinked document.

31. A system according to claim 30, wherein the loaded hyperlinked document is provided with a linked audio file.

* * * * *